United States Patent [19]

Haering et al.

[11] 4,251,606
[45] * Feb. 17, 1981

[54] BATTERY

[76] Inventors: Rudolph R. Haering, 647 Croydon Pl., Vancouver, British Columbia; James A. R. Stiles, 4133 Fairway Pl., North Vancouver, British Columbia; Klaus Brandt, #318 - 1741 W. 10th Ave., Vancouver, British Columbia, all of Canada

[ * ] Notice: The portion of the term of this patent subsequent to Jan. 13, 1998, has been disclaimed.

[21] Appl. No.: 71,402

[22] Filed: Aug. 30, 1979

Related U.S. Application Data

[63] Continuation-in-part of Ser. No. 33,718, Apr. 26, 1979, which is a continuation-in-part of Ser. No. 935,361, Aug. 21, 1978, abandoned.

[51] Int. Cl.³ .............................................. H01M 6/16
[52] U.S. Cl. .................................... 429/194; 429/219
[58] Field of Search ............... 429/194, 195, 196, 197, 429/218; 427/58, 226, 227, 228

[56] References Cited

U.S. PATENT DOCUMENTS

| 3,808,052 | 4/1974 | Dey ........................................ 429/218 |
| 3,915,740 | 10/1975 | Eisenberg ............................ 429/194 |

OTHER PUBLICATIONS

Murphy et al., Topochemical Reactions of Rutile Related Structures with Lithium, Mat. Res. Bull., vol. 13, pp. 1395-1401, 1978.
Campanella et al., MoO₃: A New Electrode Material for Nonaqueous Secondary Battery Applications, J. Electrochem. Soc., vol. 118, No. 12, (Dec. 1971), pp. 1905-1908.

Primary Examiner—Donald L. Walton

[57] ABSTRACT

A battery comprising a lithium anode and a cathode, the cathode-active material of which comprises $MoO_2$ or $MoS_2$ particles coated with $MoO_2$ is disclosed.

5 Claims, 3 Drawing Figures

BATTERY

This is a continuation-in-part of U.S. application Ser. No. 33,718 filed Apr. 26, 1979 which is a continuation-in-part of U.S. application Ser. No. 935,361 filed Aug. 21, 1978 and now abandoned.

FIELD TO WHICH THE INVENTION RELATES

This invention relates to battery cells and battery cathodes in which the cathode-active material comprises molybdenum dioxide or molybdenum dioxide coating molybdenum disulphide.

DESCRIPTION OF THE PRIOR ART

A significant amount of effort has been directed to the study of molybdenum trioxide ($MoO_3$) as a cathode-active material. In connection with these studies, lithium has often been used as the opposing anode-active material. Although $MoO_3$ is of commercial interest because of the possibility that it may be used to fabricate a high energy density battery, it is a relatively poor electrical conductor—a characteristic which imposes limitations on high current discharge performance. To improve such performance, $MoO_3$ powder is often mixed with a conducting additive such as powdered graphite. However, the charge-discharge cycle performance of the $Li/MoO_3$ couple appears to be relatively limited. Although the action of $MoO_3$ with lithium is not well understood, it is generally believed to react or tend to react in a non-reversible manner to form other oxides of molybdenum or compounds such as $Li_2MoO_4$.

Recently, $Mo_8O_{23}$ has been examined for possible use as a cathode-active material versus an anode which includes lithium as the anode-active material: see *High Energy Density Batteries Based on Lithium Anodes and Substoichiometric Oxide Cathodes in Organic Electrolytes,* Power, Sources, 1977, Vol, VI, pp. 527–536, Pietro et al. However, the $Li/Mo_8O_{23}$ couple is believed to involve an irreversible reaction resulting in production of lithium molybdates (Ibid).

An object of the present invention is to provide an improved battery cell or cathode in which the cathode-active material includes a molybdenum compound or a mixture of molybdenum compounds and which exhibits a high degree of reversibility and has good discharge rate characteristics.

A further object of the present invention is to provide a battery cathode as described which may readily be fabricated using $MoS_2$ as a raw material, the point being that $MoS_2$ is a naturally occurring substance and is relatively inexpensive.

SUMMARY OF THE INVENTION

In a broad aspect of the present invention, there is provided a battery cell which comprises a lithium anode, a non-aqueous electrolyte and a cathode having a cathode-active material which comprises molybdenum dioxide.

It has been found that $MoO_2$ itself (viz. without any substantial amount of $MoS_2$) behaves as a good cathode-active material, and that its presence as a coating on $MoS_2$ particles will improve the discharge rate characteristics over that obtainable where the cathode-active material consists essentially of $MoS_2$ particles. Cells having such cathodes have been found to exhibit a high degree of reversibility.

The electrical conductivity of a cathode is improved where a relatively thin coating of $MoO_2$ appears on $MoS_2$. As the mole percentage of $MoO_2$ coating $MoS_2$ is increased in relation to the mole percentage of $MoS_2$, the electrical conductivity of the cathode improves with only limited sacrifice of energy density characteristics. $MoO_2$ has energy density characteristics somewhat inferior to those of $MoS_2$, but conversely has superior electrical conductivity characteristics.

In given applications, the amount of $MoO_2$ present will be a function of a trade-off between energy density requirements and desired high current discharge characteristics. If high current discharge performance is not a primary consideration, then only a relatively small amount of $MoO_2$ may be present. Conversely, if high current discharge performance is of primary importance, then a relatively large amount of $MoO_2$ may be present. Indeed, as indicated above, in some applications the cathode-active material may consist essentially of $MoO_2$ with little or no $MoS_2$ present.

As is described in more detail hereinafter, the present invention lends itself to fabrication using $MoS_2$ as a raw material whether the eventually resulting cathode-active material comprises $MoO_2$ or $MoO_2$ coating $MoS_2$.

DRAWINGS

DETAILED DESCRIPTION

Figure 1:
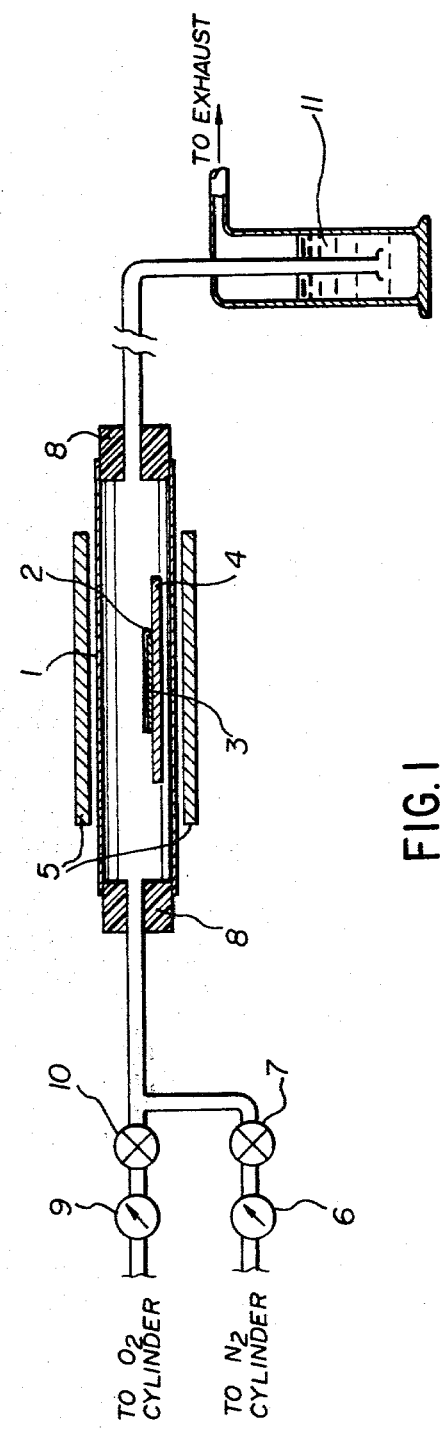
FIG. 1 is a cross-sectional front view showing a typical tube furnace having installed a quartz tube containing an aluminum support slab bearing a glass slide on which a foil substrate with applied film to be baked is mounted. Also shown are baking atmosphere inlet and exhaust ports.

The description which follows deals primarily with the fabrication of battery cathodes which have a cathode-active material consisting essentially of $MoO_2$ particles or $MoS_2$ particles coated with $MoO_2$. The fabrication of complete cells which include a lithium anode and a selected electrolyte is discussed in the Examples which appear at the end of the description. The construction of lithium anodes and complete cells is not discussed in detail because the techniques involved are purely conventional and well known to those skilled in the art.

To fabricate from $MoS_2$ a battery cathode which comprises $MoO_2$ as a cathode-active material, particles of $MoS_2$ are oxidized to form $MoO_2$ or $MoO_3$. In cases where $MoO_2$ is formed, it will not necessarily be the case that the $MoS_2$ is completely oxidized to $MoO_2$. In fact, for some applications, it is contemplated that only a relatively small proportion of the $MoS_2$ present will be oxidized to $MoO_2$. In cases where $MoO_3$ is formed by oxidization of the $MoS_2$, substantially all the $MoS_2$ present is oxidized and there then follows a subsequent reduction step during which substantially all the $MoO_3$ is reduced to $MoO_2$.

Herein, conversion of $MoS_2$ to $MoO_2$ or to a mixture of $MoS_2$ and $MoO_2$ will be referred to as "direct conversion" as distinct from "indirect conversion", which comtemplates conversion from $MoS_2$ to $MoO_3$ followed by conversion of the $MoO_3$ to $MoO_2$.

$$\frac{MoS_2 \text{ to } MoO_2 \text{ or a mixture of } MoS_2 \text{ and } MoO_2}{\text{("direct conversion")}} \quad (a)$$

A suspension of finely divided $MoS_2$ particles in a suitable suspending media is applied to a metallic substrate.

Various suspending media are suitable, the primary requisite being that the viscosity be sufficiently high to allow handling of the substrate when coated without significant loss of the suspending media from the substrate surface. Preferably, a liquid having a boiling point below the baking temperature (discussed hereinafter) is chosen so that the liquid will evaporate before the baking temperature is reached, thus reducing the possibility that the liquid may interfere with the oxidization process. The inventors suggest the use of a liquid such as propylene glycol as the suspending media.

A variety of metals or metal alloys are suitable for use as a substrate, the primary requisites being that they do not adversely react with $MoS_2$ or $MoO_2$ and do not themselves oxidize to produce unacceptable side effects. Preferred substrate materials include aluminum or titanium or alloys thereof, or stainless steel. The inventors have found aluminum foil used for ordinary household purposes to be quite acceptable as a substrate. Platinum may be used, but its cost will likely be considered prohibitive for most commercial applications. Nickel may also be used; however, problems may be encountered with excessive oxidation of the nickel when the $MoS_2$ particles are oxidized on the substrate. The nickel substrate may lose mechanical rigidity and its electrical conductivity may be degraded. Although the other substrate materials may be oxidized at least in part during the oxidization of $MoS_2$ particles, they do not appear as susceptible to the problems which have been encountered with nickel.

The suspension of finely divided $MoS_2$ particles may be applied to only one or to both faces of the substrate. If the suspension is applied to only one face, then the substrate may be placed with the coated face up on a slab of material such as aluminum which acts as a support during the baking procedure described hereinafter. If the suspension is applied to both faces of the substrate, the substrate should preferably be suspended to permit a free flow of the baking atmosphere past both substrate faces.

The inventors have found it convenient to use as a substrate a strip of aluminum foil having a width approximately equal to the width of a standard microscope slide. One of the narrower ends of the strip is bent around one of the narrower ends of the slide. The aluminum foil strip thus mounted on a microscope slide is easy to handle during subsequent steps of cathode preparation. The inventors advise against bending both ends of the strip around corresponding ends of the microscope slide because glass and aluminum have different coefficients of thermal expansion which might result in buckling during baking of the strip.

The suspension is preferably applied to the substrate to yield a film-like coating which is sufficiently thin to allow diffusion of oxygen throughout the coating in a time which is relatively short compared to the reaction time of oxygen with $MoS_2$. This will encourage the formation of a homogeneously oxidized cathode. The time required for oxygen to diffuse throughout the coating has been found to depend upon the average $MoS_2$ particle size in the coating, the packing density of $MoS_2$ particles in the coating, and the baking temperature. It has been found that coatings of up to at least 20 mg of $MoS_2$ per $cm^2$ having an average particle size of about 20 microns may be uniformly oxidized onto an aluminum substrate at temperatures ranging between about 400° C. to 650° C. The thickness of the coating which may be oxidized onto a given substrate will to some extent be governed by the substrate material chosen. The substrate and the coating will likely have different coefficients of thermal expansion, which, depending upon the relative difference between these coefficients, may result in buckling or cracking of the coating during baking if an attempt is made to oxidize a coating which is too thick.

The substrate with applied film is placed on the support slab (or suspended) in a closed tube made from a heat resistant material such as quartz, the whole of which is then inserted into a tube furnace.

By way of example, FIG. 1 illustrates a quartz tube 1 having single-hole neoprene stoppers 8 inserted in both ends. The substrate 2 with the applied film is mounted on microscope slide 3 which rests on support slab 4. The support slab, microscope slide and substrate with applied film are inserted in quartz tube 1 which is then placed in a standard Lindberg tube furnace 5 which has been preheated to a temperature below the melting point of the metal foil substrate. (For aluminum substrates which melt at about 650° C., the furnace is preferably preheated to about 525° C. to 610° C. Above this range, problems of differential thermal expansion of the aluminum may be encountered, possibly resulting in buckling or cracking of the substrate coating. At lower temperatures, correspondingly longer oxidization times are required—which may detract from the commercial suitability of the method.)

An inert gas flow is maintained at a fixed rate with the aid of flowmeter 6 and needle valve regulator 7. Gases which have flowed through quartz tube 1 may be passed through bubbler apparatus 11 to assist in preventing back flow of air into quartz tube 1. Various gases are suitable as the inert gas. Both purified nitrogen and argon have proven to be acceptable. It is expected that helium would also perform satisfactorily.

The substrate and applied film is baked in the inert atmosphere, thereby driving off the suspending media for the $MoS_2$ particles. After the substrate and applied film has been allowed to reach thermal equilibrium (at which point substantially all of the suspending media should have evaporated), oxygen is admitted to closed tube 1 and is caused to flow with the aid of the flowmeter 9 and the needle valve regulator 10 past the substrate to oxidize the $MoS_2$ particles.

Gas flow rate is adjusted with the aid of flowmeters 6 and 9 and needle valve regulators 7 and 10, such that the flow rate is fast enough to prevent a backflow of air into the tube through the tube gas outlet port, but also slow enough to prevent cooling of the substrate due to the flow of gas past the substrate. If the gas flow rate is too low, an oxygen concentration gradient may be set up along the length of the substrate such that more oxygen will diffuse into the coating at the end of the substrate closest to the source of the oxygen flow than will diffuse into the coating at the end of the substrate farthest from the source of the oxygen flow. The gas flow rate must therefore be adjusted to minimize the effect of any such oxygen concentration gradient.

It is considered that the problem with oxygen concentration gradient and the resultant requirement for careful control over the gas flow rate may be alleviated by adapting the method to the production of a continuous cathode by moving a continuous strip of substrate with applied film past a stationary oxygen source which bathes the moving strip in oxygen for a time period dependent upon the rate at which the strip is moving. The inventors believe that production of cathodes by such a moving strip method may result in an economically viable means for mass production of cathodes.

Use of a vacuum furnace may also alleviate the oxygen concentration gradient problem. If a vacuum furnace is used then the partial pressure of oxygen within the furnace may be monitored to yield a concentration of oxygen equivalent to that which would have been required if oxygen in an inert gas atmosphere had been used. A "cold trap" may also be used to remove sulphur dioxide produced during oxidization of $MoS_2$ in the vacuum furnace.

Where direct conversion from $MoS_2$ to $MoO_2$ or to a mixture of $MoS_2$ and $MoO_2$ is to be achieved, careful regulation of oxygen concentration and oxidization time is required. For a given average $MoS_2$ particle diameter and a given oxidization time, the maximum allowable concentration of oxygen in the inert atmosphere which will impede the formation of molybdenum oxides other than $MoO_2$ has been found to be dependent upon temperature and upon the thickness of the film desired to be oxidized. The inventors are not able to provide generalized conclusions respecting the conditions under which the formation of molybdenum oxides other than $MoO_2$ will be impeded. Reference should be made to the Examples which follow. Of course, in adjusting the concentration of oxygen in combination with the parameters discussed below, care should be taken not to establish an oxygen concentration gradient along the length of the substrate, as mentioned above.

Once a baking temperature is selected, and a corresponding suitable concentration of oxygen in a given inert gas determined, a suitable oxidization time must be determined. The rate of oxidation of $MoS_2$ has been found to vary approximately exponentially with temperature and approximately linearly with oxygen concentration (below the maximum allowable oxygen concentration above which formation of molybdenum oxides other than $MoO_2$ may occur). The oxidization time should be selected to be sufficiently long to allow the desired proportion of $MoS_2$ to be converted to $MoO_2$, but sufficiently short to prevent the reaction of $MoO_2$ with oxygen to form other molybdenum oxides. An appropriate oxidization time may be determined empirically. For example, several substrates with applied films which have been baked for varying lengths of time may be examined through x-ray diffraction analysis to determine the amounts of $MoO_2$ and/or other molybdenum oxides produced. Oxidization times of a few minutes have been found appropriate at higher temperatures (about 550° C.), while oxidization times of several hours have been found to be required at lower temperatures.

By direct conversion, it is possible to produce cathodes in which the cathode-active material is a "mixture" of both $MoO_2$ and $MoS_2$ in ratios which may vary substantially over the entire compositional range (i.e. about 100% $MoO_2$ to about 100% $MoS_2$). Such cathodes may be produced by baking the substrate and applied coating for a time sufficient to allow only a selected proportion of $MoS_2$ to be converted to $MoO_2$. Cathodes containing a "mixture" of $MoS_2$ and $MoO_2$ may not be produced by the "indirect" conversion discussed hereinafter since substantially all of the $MoS_2$ is converted to $MoO_3$ which is then converted to $MoO_2$. The inventors advise against simply mixing selected proportions of $MoS_2$ particles and $MoO_2$ particles and then adhering the mixed particles onto the substrate in some manner to fabricate a cathode in which the cathode-active material is a "mixture" of both $MoS_2$ and $MoO_2$. The inventors believe that when a cathode containing such a "mixture" is produced by direct conversion, then an $MoO_2$ coating forms on the $MoS_2$ particles. Thus, individual $MoS_2$ particles are given a metallic coating which improves electrical conductivity between adjacent particles. If $MoS_2$ particles are simply mixed indiscriminately with $MoO_2$ particles, it is believed that problems of electrical conductivity may be experienced in the completed cathode.

By way of summary and further explanation, the following procedure has been found acceptable for fabricating by direct conversion a battery cathode which includes $MoO_2$ as a cathode-active material:

$MoS_2$ concentrate is washed in organic solvents and water to remove substantially all traces of organic impurities. Inorganic impurities may also be removed by a leaching process or in any known manner.

The $MoS_2$ concentrate is then mixed with a viscous liquid. The mixture should comprise approximately equal parts by volume of $MoS_2$ and viscous liquid. Propylene glycol has been found to be an acceptable viscous liquid. The resulting slurry is applied as a film to a metal substrate. A screening process may be used to yield a film of uniform desired thickness. The substrate and applied film may be dried in an oven at 100° C. for a few minutes to simplify handling. The substrate may be, for example, a piece of aluminum foil. The inventors have used an aluminum foil strip having an area of approximately 20 cm$^2$ and approximately 20 microns thick as a substrate. In using an aluminum substrate, the inventors usually apply a film to yield a distribution of up to about 20 mg/cm$^2$ of $MoS_2$ on the substrate.

The substrate with applied film is then placed directly on a support slab with the coated surface of the substrate away from the support slab. An aluminum slab measuring approximately 12 inches $\times$ 2 inches $\times$ ¼ inch may be used as a support. The support and substrate are then placed in a quartz tube such that the substrate with applied film is longitudinally aligned with the tube axis. An inert gas is caused to flow through the tube. Once the tube has been flushed of air (approximately 10 minutes after the inert gas begins to flow), the tube is placed in a standard Lindberg-type tube furnace which has been preheated to the pre-selected baking temperature and the substrate is allowed to reach thermal equilibrium in the furnace. Once the substrate has reached thermal equilibrium, oxygen is added to the inert gas flowing through the tube at a rate governed as described above. The oxygen concentration and a corresponding baking temperature are predetermined as described above to discourage formation of molybdenum oxides other than $MoO_2$ during baking. The tube is left in the furnace with the gas mixture flowing for an oxidization time (which has been pre-determined as described above) which is sufficient to convert a selected proportion, or substantially all of the $MoS_2$ to $MoO_2$, but not long enough to encourage the further conversion of $MoO_2$ to other molybdenum oxides. The oxygen flow is turned off at the end of the oxidization time, the inert gas flow maintained and the tube is removed from the furnace. After the tube has cooled (approximately 5 minutes) the inert gas flow is turned off and the completed cathode is removed from the tube.

(b) $MoS_2$ to $MoO_3$ to $MoO_2$ ("indirect conversion")

As indicated above, to produce an $MoO_2$ cathode "indirectly" from $MoS_2$ there is first an oxidization step, then a reduction step.

The oxidization step may be performed by following the procedure generally as described for direct conversion. However, since the object of the oxidization step now is to encourage conversion of the $MoS_2$ to $MoO_3$ and not to $MoO_2$, careful regulation of oxygen concentration and oxidization time is not as critical as it is in the case of direct conversion when the object is to encourage conversion of the $MoS_2$ to $MoO_2$ and not to $MoO_3$.

Thus, to effect the oxidization step, an $MoS_2$ film may be applied to a metal foil substrate and the substrate and applied film then placed on a support slab and inserted into a quartz tube as described in the case of direct conversion. The tube containing the support slab, substrate and applied film is then placed in a standard Lindberg tube furnace which has been preheated (preferably to about 525° C. to 610° C. if an aluminum substrate is used), and an oxygen containing atmosphere is then caused to flow through the tube. The tube is left in the furnace until substantially all of the $MoS_2$ has been converted to $MoO_3$ (the substrate coating should be pale yellow or white in color when this has happened). Then, the reduction step follows.

To effect reduction, the oxygen flow is turned off and, preferably, the tube is flushed with an inert gas (e.g. nitrogen) for several minutes before the reducing atmosphere is introduced. Then, a reducing atmosphere such as hydrogen mixed with the inert gas is caused to flow through the tube, the furnace temperature having been lowered to a temperature in the neighbourhood of 430° C. to 450° C. The substrate is baked in the reducing atmosphere for several hours until substantially all of the $MoO_3$ has been reduced to $MoO_2$. The hydrogen flow is then turned off, and the tube removed from the furnace and allowed to cool for approximately 5 minutes before the completed cathode is removed.

EXAMPLES

The following examples are provided to give those skilled in the art a better understanding of the invention:

Example 1

A cathode which included $MoO_2$ as the cathode-active material was constructed on a platinum foil strip using direct conversion as follows:
(a) 3 milligrams of a 10% by weight suspension in heavy lubricating oil of $MoS_2$ particles having an average particle diameter of about 0.25 microns was applied as a film to the platinum substrate.
(b) The coated substrate was inserted into a quartz tube through which nitrogen gas was caused to flow at about 0.8 liters per minute.
(c) The tube was then placed in a Lindberg tube furnace which had been preheated to about 575° C. The tube was allowed to reach thermal equilibrium in the furnace.
(d) A mixture of about 0.1 mole percent oxygen in nitrogen was then caused to flow through the tube at about 0.8 liters per minute for 2 minutes. Then, pure nitrogen was again caused to flow through the tube for a further 3 minutes.
(e) The tube was then removed from the furnace and allowed to cool for about 5 minutes after which time the nitrogen flow was turned off and the completed cathode removed from the tube.

Figure 2:
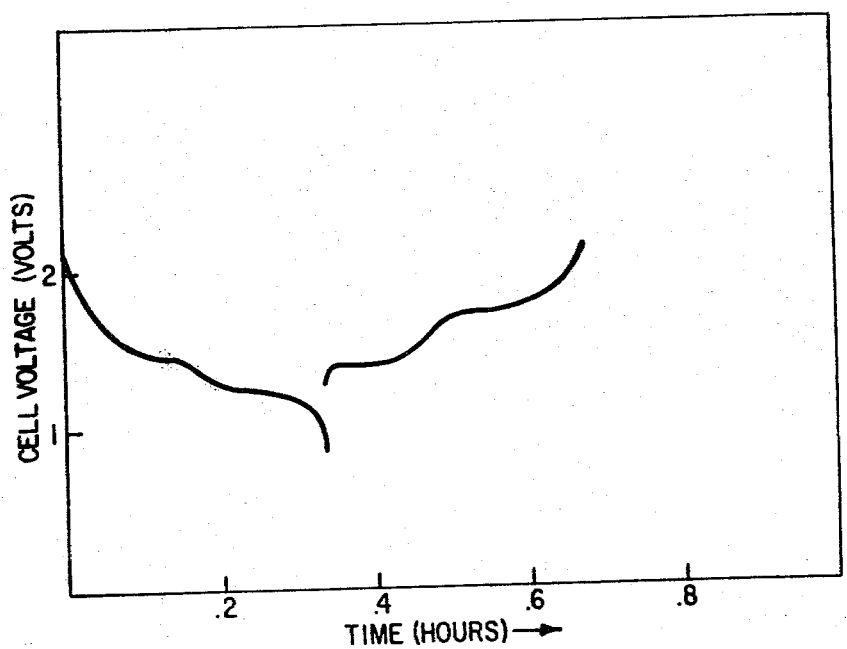
FIG. 2 is a graph showing discharge and recharge characteristics of a cell constructed as described hereinafter in Example 1. Cell voltage is plotted as the ordinate with time in hours plotted as the abscissa.

The completed cathode was used to construct a cell in a glass beaker which was sealed with a neoprene stopper. A lithium anode and the prepared cathode were suspended in the beaker from wires fitted through holes drilled into the stopper. The beaker was filled with about 20 cc of a 0.7 M solution of LiBr in propylene carbonate which served as the cell electrolyte. An argon atmosphere was introduced into the airtight beaker. The cell was then discharged and recharged at 200 microamperes. FIG. 2 is a graph in which the cell voltage discharge and recharge characteristics are plotted versus time.

Example 2

An $MoO_2$ cathode was made using indirect conversion as follows:
(a) A coating of about 1.6 mg/cm² $MoS_2$ was applied as a film to a 19 cm² piece of 20 micron thick aluminum foil.
(b) The substrate with applied film was placed on an aluminum support slab and inserted in a quartz tube through which a pure nitrogen atmosphere was caused to flow. The tube was placed in a Lindberg tube furnace which had been preheated to about 575° C., and allowed to reach thermal equilibrium in the furnace.
(c) A gas mixture of about 0.3 mole percent oxygen in nitrogen was then caused to flow through the tube for about 17 minutes. This time was found to be sufficient to convert the approximately 1 micron $MoS_2$ particles to $MoO_3$.
(d) The furnace temperature was then reduced to 440° C. and a hydrogen atmosphere caused to flow through the tube. The baking was continued for 9 hours before the completed cathode was removed from the furnace and tube.

X-ray diffraction analysis revealed that the substrate was coated with essentially pure $MoO_2$ containing relatively small trace amounts of molybdenum metal.

A cell was constructed as in Example 1 using a 2.5 cm² piece of the prepared cathode. Discharge characteristics similar to those of Example 1 (as shown in FIG. 2) were obtained.

Example 3

A cathode was constructed on a 20 micron thick piece of aluminum foil using direct conversion as follows:
(a) $MoS_2$ powder having an average particle diameter of about 20 microns was mixed in a 1 to 1 volume ratio with propylene glycol and a film of the resulting slurry applied to the aluminum foil substrate.
(b) The substrate with applied film was baked at 580° C. in an atmosphere containing about 0.4 mole percent oxygen in nitrogen for about 10 minutes to form a cathode containing approximately 20 mole percent MoO$_2$ and approximately 80 mole percent MoS$_2$.

A cell was constructed using two stainless steel flanges separated by a neoprene O-ring sealer. The anode consisted of a 6 cm$^2$ sheet of lithium. A 6 cm$^2$ piece of the prepared cathode (on which had been deposited approximately 43 milligrams of cathode-active material (MoO$_2$+MoS$_2$)) was used as the cell cathode. A porous polypropylene separator sheet which had been soaked in a 1 M solution of lithium perchlorate in propylene carbonate was inserted between the anode and the cathode.

Figure 3:
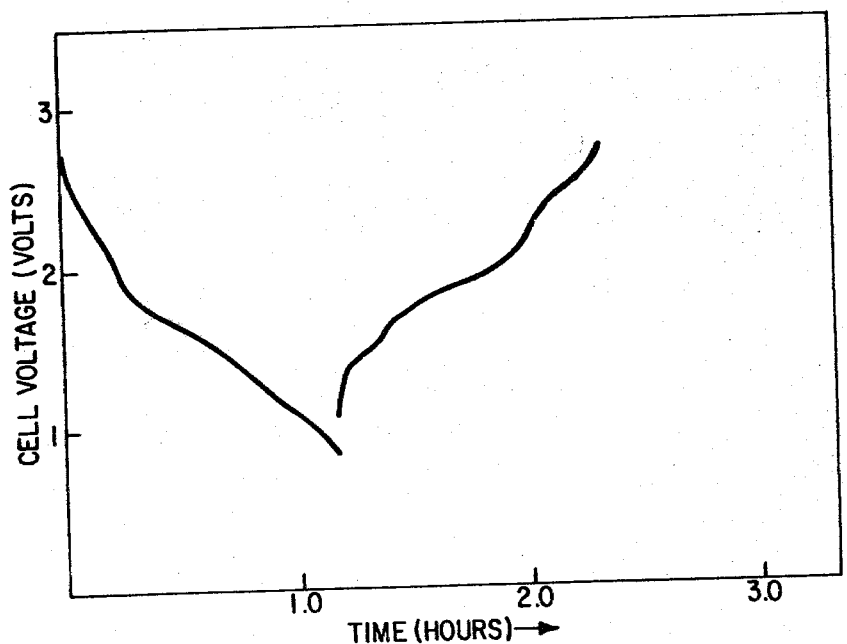
FIG. 3 is a graph showing discharge and recharge characteristics of a cell constructed as described hereinafter in Example 3. Cell voltage is plotted as the ordinate with time in hours plotted as the abscissa.

The newly constructed cell was conditioned by initially discharging it at 4 milliamperes to a lower cutoff voltage of about 0.85 volts. During this initial discharge, the cell voltage dropped in about 20 minutes to a plateau of about 1 volt and then decreased approximately linearly to about 0.85 volts in a further 2 hours. The cell thus prepared and conditioned was cycled through 66 discharge-charge cycles at about 4 millamperes between a minimum voltage of about 0.85 volts and a maximum voltage of about 2.7 volts. FIG. 3 is a graph which shows the cell discharge-charge characteristic beginning with the fifth discharge.

Alternatively, particulate MoS$_2$ may be converted to particulate MoO$_2$ using either direct or indirect conversion. For example, if indirect conversion is used MoS$_2$ particles may be stirred or tumbled while baking them in an oxygen-containing atmosphere to yield particulate MoO$_3$ and then further stirring or tumbling the MoO$_3$ particles while baking them in a reducing atmosphere to yield particulate MoO$_2$. Then, when it is desired to produce a cathode which comprises MoO$_2$ as a cathode-active material, a suspension of some of the MoO$_2$ particles may be applied as a film to a metallic substrate as described above and then baked in an inert atmosphere to drive off the suspending media for the particles, leaving a coating of MoO$_2$ adherent on the substrate. In the case of direct conversion, MoS$_2$ particles are converted to MoO$_2$ or MoS$_2$ coated with MoO$_2$ while stirring or tumbling in an oxygen-containing atmosphere. The following is an example where direct conversion was used: EXAMPLE (a) MoS$_2$ powder having an average particle diameter of about 20 microns was placed inside a quartz tube which was then inserted into a Lindberg tube furnace.

(b) A mixture of oxygen gas flowing at about 4 c.c./min. and nitrogen gas flowing at about 2 liters/min. was caused to flow through the tube for about one hour durin which time the furnace temperature was held at about 550° C. The quartz tube was continually rocked during this time to stir the particles.

(c) The quartz tube was then removed from the furnace and allowed to cool.

(d) A sample of the oxidized powder was suspended in propylene glycol and applied as a film to an aluminum substrate which was then baked in a nitrogen atmosphere at about 550° C. for about 15 minutes to yield a 6 cm$^2$ cathode bearing about 30 mg. of cathode-active material.

(e) The completed cathode was used to construct a cell as in Example 3.

(f) The newly constructed cell was cooled to about 0° C. and then conditioned at 0° C. by initially discharging it at 1 milliampere to a lower cutoff voltage of about 0.65 volts. During this initial discharge, the cell voltage dropped to a plateau of about 1 volt and then decreased approximately linearly to about 0.65 volts.

(g) The cell thus prepared and conditioned was cycled at ambient temperature at about 2 milliamperes between about 1.1 volts and about 2.7 volts.

We claim:

1. A battery cell, comprising:
   (a) a lithium anode;
   (b) a non-aqueous electrolyte; and,
   (c) a cathode having a cathode-active material which comprises molybdenum dioxide.

2. A battery cell, comprising:
   (a) a lithium anode;
   (b) a non-aqueous electrolyte; and,
   (c) a cathode having a cathode-active material which comprises molybdenum dioxide and molybdenum disulphide.

3. A battery cell, comprising:
   (a) a lithium anode;
   (b) a non-aqueous electrolyte; and,
   (c) a cathode having a cathode-active material which consists essentially of molybdenum disulphide particles coated with molybdenum dioxide.

4. A battery cell as defined in claim 2 or 3, wherein the mole percentage of molybdenum disulphide is relatively small in relation to the mole percentage of molybdenum dioxide.

5. A battery cell as defined in claim 2 or 3, wherein the mole percentage of molybdenum disulphide is relatively large in relation to the mole percentage of molybdenum dioxide.

* * * * *